US009133315B2

(12) United States Patent
Uehara et al.

(10) Patent No.: US 9,133,315 B2
(45) Date of Patent: Sep. 15, 2015

(54) METHOD FOR PRODUCING ULTRAHIGH MOLECULAR WEIGHT POLYETHYLENE FILM

(75) Inventors: Hiroki Uehara, Kiryu (JP); Takeshi Yamanobe, Kiryu (JP); Takuya Tamura, Kiryu (JP)

(73) Assignee: National University Corporation Gunma University, Gunma (JP)

( * ) Notice: Subject to any disclaimer, the term of this patent is extended or adjusted under 35 U.S.C. 154(b) by 412 days.

(21) Appl. No.: 13/254,509

(22) PCT Filed: Mar. 4, 2010

(86) PCT No.: PCT/JP2010/053543
§ 371 (c)(1),
(2), (4) Date: Sep. 2, 2011

(87) PCT Pub. No.: WO2010/101214
PCT Pub. Date: Sep. 10, 2010

(65) Prior Publication Data
US 2011/0319585 A1 Dec. 29, 2011

(30) Foreign Application Priority Data
Mar. 6, 2009 (JP) ................................. 2009-053163

(51) Int. Cl.
*B29C 55/16* (2006.01)
*C08J 5/18* (2006.01)
(Continued)

(52) U.S. Cl.
CPC . *C08J 5/18* (2013.01); *B29C 55/16* (2013.01); *B29C 55/005* (2013.01); *B29C 55/10* (2013.01);
(Continued)

(58) Field of Classification Search
CPC ............... C08F 110/02; C08F 2500/01; C08F 2500/26; B29C 55/005; B29C 55/10; B29C 55/12; B29C 55/16; B29C 2791/001
See application file for complete search history.

(56) References Cited

U.S. PATENT DOCUMENTS 6,054,086 A * 4/2000 Kurihara et al. ............... 264/147
7,445,735 B2 * 11/2008 Miller et al. .................... 264/49
(Continued)

FOREIGN PATENT DOCUMENTS

| JP | 58-089326 | 5/1983 |
| JP | 60-99648 | 3/1985 |

(Continued)

OTHER PUBLICATIONS

Bolcof Plastic Materials website for ultra-high molecular weight polyethylene. Retrieved from http://www.bolcofplastic.com on Aug. 22, 2013.*

(Continued)

*Primary Examiner* — Richard A Huhn
(74) *Attorney, Agent, or Firm* — Kilpatrick Townsend & Stockton LLP (57) ABSTRACT

Disclosed is a method for producing a ultra high molecular weight polyethylene film, which comprises: a step of forming a film using a ultra high molecular weight polyethylene material; a step of biaxially drawing the film obtained in the step in the x-axis direction and in the y-axis direction at a temperature not less than the melting point of the ultra high molecular weight polyethylene material; and the step of shrinking the film along at least one of the x-axis direction and y-axis direction. By this method, a ultra high molecular weight polyethylene film having high tensile strength at break, high tear strength and excellent uniformity can be efficiently produced at low cost.

12 Claims, 3 Drawing Sheets (51) Int. Cl.
 B29C 55/00 (2006.01)
 B29C 55/10 (2006.01)
 B29C 55/12 (2006.01)
 B29C 55/14 (2006.01)
 B29K 23/00 (2006.01)

(52) U.S. Cl.
 CPC ............... *B29C 55/12* (2013.01); *B29C 55/14* (2013.01); *B29C 2791/001* (2013.01); *B29K 2023/0683* (2013.01); *C08J 2323/06* (2013.01)

(56) References Cited

U.S. PATENT DOCUMENTS

| | | | |
|---|---|---|---|
| 2007/0012617 A1* | 1/2007 | Suzuki et al. | 210/500.27 |
| 2007/0196638 A1* | 8/2007 | Wei et al. | 428/304.4 |
| 2007/0281186 A1* | 12/2007 | Yoshida et al. | 428/847.4 |
| 2009/0127733 A1 | 5/2009 | Takita et al. | |
| 2009/0274955 A1* | 11/2009 | Kikuchi et al. | 429/144 |

FOREIGN PATENT DOCUMENTS

| | | |
|---|---|---|
| JP | 02-030514 | 1/1990 |
| JP | 04-091926 | 3/1992 |
| JP | 09-183156 | 7/1997 |
| JP | 2003-105121 | 4/2003 |
| JP | 2003-105122 | 4/2003 |
| JP | 2003103626 A | 4/2003 |
| JP | 2003-165155 | 6/2003 |
| JP | 2004-335255 | 11/2004 |
| JP | 2005-314544 | 11/2005 |
| WO | WO 2007010878 A1 * | 1/2007 .............. B32B 27/32 |
| WO | 2007/046496 | 4/2007 |
| WO | 2009028737 A1 | 3/2009 |

OTHER PUBLICATIONS

George Odian, "Principles of Polymerization," 4th ed., John Wiley & Sons, 2004, pp. 19-24.*

"Notification of Transmittal of Translation of the International Preliminary Report on Patentability", PCT/JP2010/053543, Nov. 10, 2011.

Uehara et al., "Continuous Film Processing from Ultrahigh-Molecular-Weight Polyethylene Reactor Powder and Mechanical Property Development by Melt Drawing," *Industrial & Engineering Chemistry Research*, vol. 45, No. 23, Nov. 2006, pp. 7801-7806.

Nakae et al., "Structure Development upon Melt Drawing of Ultrahigh Molecular Weight Polyethylene: Effect of Prior Thermal History," *Macromolecules*, vol. 33, No. 7, Apr. 2000, pp. 2632-2641.

European Patent Application No. 10748807.4, Extended European Search Report, mailed on Jun. 30, 2015, 6 pages.

* cited by examiner

METHOD FOR PRODUCING ULTRAHIGH MOLECULAR WEIGHT POLYETHYLENE FILM

CROSS REFERENCE TO RELATED APPLICATIONS

This application claims the benefit of International Application No. PCT/JP2010/053543, filed Mar. 4, 2010, which claims priority to Japanese Patent Application No. 2009-053163, filed Mar. 6, 2009, which are both incorporated herein by reference in their entireties.

TECHNICAL FIELD

The present invention relates to a method of inexpensively and efficiently producing a ultra high molecular weight polyethylene film having a high tensile strength at break, high tear strength and excellent uniformity.

Ultra high molecular weight polyethylenes are classified as a type of engineering plastic and are known to exhibit excellent mechanical and physical properties because of their molecular weight (viscosity average molecular weight: Mv) of not less than 1,000,000, which is extremely high as compared to high density polyethylenes that are general-purpose plastics. However, since ultra high molecular weight polyethylenes have an extremely high melt viscosity and kneading thereof is difficult, it is very difficult to mold them by a method which involves kneading.

According to Non-patent Document 1, in the case of a macromolecular material, various characteristics such as mechanical properties can be generally improved by performing a treatment to align the directions of the macromolecular chains (orientation treatment). There are a variety of orientation treatments depending on the shape of the molding; however, in the case of a film or sheet, tensile drawing is believed to be the most effective orientation treatment. In a commonly-used high-density polyethylene, since the entangled molecular chains can be disentangled even in a solid state drawing, a molecular orientation can be relatively easily imparted; however, in the case of a ultra high molecular weight polyethylene, since the entanglement density of the molecular chains is high due to the length thereof, it is difficult to improve the physical properties by an orientation treatment.

Therefore, in the case of such ultra high molecular weight polyethylene, since the moldability tends to be impaired when the molecular weight is further increased in order to improve the physical properties, materialization of ultimate physical properties for polyethylene has not been achieved by a further increase in the molecular weight of ultra high molecular weight polyethylene.

Recently, Patent Document 1 reported the findings of a study relating to inflation molding technique using a ultra high molecular weight polyethylene. With regard to the mechanical properties of a film obtained by this method, it was confirmed that this method can yield a film having a higher strength as compared to skiving method where a film is skived from a molding obtained by compression molding technique, which is a typical molding method of ultra high molecular weight polyethylenes. Although ultra high molecular weight polyethylene has been considered to have difficulty in molding and provision of a molding with high physical properties, molding thereof is now able to be improved by such processing technology, so that it has been found possible to allow ultra high molecular weight polyethylenes to exhibit very high physical properties, which could not be realized so far.

Still, in the above-described film obtained by inflation molding, the viscosity average molecular weight is also at a level of around 1,000,000; thus, in cases where it is attempted to mold a ultra high molecular weight polyethylene having a greater viscosity average molecular weight, such polyethylene cannot be extruded due to excessive motor load or, if forcibly extruded, it becomes degraded due to scission of the molecular chains at the time of melt-kneading, and consequently, the ultimate physical properties expected for such ultra high molecular weight polyethylene cannot be expressed due to a decrease in its molecular weight. Therefore, there are still many problems in molding of a ultra high molecular weight polyethylene having a molecular weight of 1,000,000 or greater.

Furthermore, since even the thinnest ultra high molecular weight polyethylene film obtained by the skiving method has a thickness of about 100 µm, which is too thick to be used as a lithium ion battery separator or the like, there are demanded a film which is thinner and has excellent tensile strength and tear strength, as well as a method of producing such film.

In order to obtain a ultra high molecular weight polyethylene molding with high physical properties by making its molecules highly oriented, there is a method of reducing the entanglement of the molecular chains and ultra-drawing the mold. Examples of this method include surface-growth-fiber drawing method, single-crystal-mat drawing method, gel drawing method and reactor powder drawing method.

On the other hand, there is a melt drawing method in which a ultra high molecular weight polyethylene molding is drawn in a molten state utilizing entanglement of the molecular chains. This is a drawing method which utilizes the characteristics of a material, such as a ultra high molecular weight polyethylene, containing a large amount of entangled molecular chains and exhibiting rubber elasticity even in a molten state. In this case, since the molecular entanglements transmit the drawing stress, the molecular chains can be oriented. The reason why a ultra high molecular weight polyethylene can be drawn with a high draw ratio at a temperature not lower than the melting point is believed to be because the entangled molecular chains are partially disentangled during the melt drawing process. However, since the molecular chains become more entangle as the molecular weight of ultra high molecular weight polyethylene increases, it is difficult to prepare a uniform sheet-form molding.

Patent Document 2 proposes a method of producing a ultra high molecular weight polyethylene molding, which method is characterized in that, after directly molding a polyethylene film from ultra high molecular weight polyethylene reactor powder material at a temperature higher than the melting point of the polyethylene reactor powder material, the obtained polyethylene film is drawn at a temperature not lower than the melting point thereof to obtain a polyethylene molding having a tensile elastic modulus (24° C.) of not less than 25 GPa. However, what is disclosed therein is only uniaxial drawing; therefore, in terms of the physical properties of the obtained ultra high molecular weight polyethylene film, there is room for improvement in the strength and uniformity.

PRIOR ART DOCUMENTS

Patent Documents

Patent Document 1: JP H9-183156A
Patent Document 2: JP2003-165155A

Non-Patent Document

Non-patent Document 1: Polymer Processing One Point 4: Aligning Macromolecules, Kyoritsu Shuppan Co., Ltd. 1993

SUMMARY OF THE INVENTION

An object of the present invention is to provide a method which can inexpensively and efficiently produce a ultra high molecular weight polyethylene film having high tensile strength at break, high tear strength and excellent uniformity.

In order to solve the above-described problems, the present inventors intensively studied, and discovered that a ultra high molecular weight polyethylene film having high tensile strength at break, high tear strength and excellent uniformity can be produced by biaxially drawing a film molded using a ultra high molecular weight polyethylene as starting material in the x-axis and y-axis directions at a temperature higher than the melting point of the ultra high molecular weight polyethylene and subjecting the film to a shrinkage treatment along at least one of the x-axis and y-axis, thereby completed the present invention.

That is, the means for solving the above-described problems are as follows.
(1) A method of producing a ultra high molecular weight polyethylene film, comprising the steps of molding a film using a ultra high molecular weight polyethylene material; biaxially drawing the film obtained in said step in the x-axis and y-axis directions at a temperature not lower than the melting point of the ultra high molecular weight polyethylene material; and subjecting the film to a shrinkage treatment along at least one of the x-axis and y-axis.
(2) The method of producing a ultra high molecular weight polyethylene film according to (1), wherein the ultra high molecular weight polyethylene material has a viscosity average molecular weight of 1,000,000 to 12,000,000.
(3) The method of producing a ultra high molecular weight polyethylene film according to (1) or (2), wherein the biaxially drawing is carried out at 136 to 165° C.
(4) The method of producing a ultra high molecular weight polyethylene film according to any one of (1) to (3), wherein the shrinkage treatment is carried out at 120 to 165° C.
(5) The method according to any one of (1) to (4), wherein the shrinkage treatment is carried out biaxially along the x-axis and y-axis.
(6) The method according to any one of (1) to (5), further comprising the step(s) of subjecting the film to heat treatment (s) after the shrinkage treatment.
(7) The method according to any one of (1) to (6), further comprising the step(s) of re-drawing the film along at least one of the x-axis and y-axis after the shrinkage treatment or heat treatment.
(8) The method according to (7), wherein the shrinkage treatment, heat treatment and/or re-drawing treatment is/are further repeated.
(9) The method of producing a ultra high molecular weight polyethylene film according to any one of (1) to (8), further comprising the step of subjecting the film to a pore-forming treatment.
(10) A ultra high molecular weight polyethylene film, which is obtained by the method according to any one of (1) to (9).
(11) A method of improving at least either of the tensile strength at break and tear strength of a ultra high molecular weight polyethylene film, comprising the steps of biaxially drawing a film molded using a ultra high molecular weight polyethylene as starting material in the x-axis and y-axis directions at a temperature not lower than the melting point of the ultra high molecular weight polyethylene material; and subjecting the film to a shrinkage treatment along at least one of the x-axis and y-axis.

According to the present invention, a ultra high molecular weight polyethylene film which has high tensile strength at break, high tear strength and excellent uniformity (high degree of crystallization) and is applicable in various fields can be provided inexpensively and efficiently.

The ultra high molecular weight polyethylene film produced by the present invention can be made thin; therefore, it can be processed and used as a separator of lithium ion battery. Since a separator film of lithium ion battery can be made thin by the method according to the present invention and more cell stacks can be consequently housed in the same volume, the electric generating capacity can be improved. Furthermore, the polyethylene film according to the present invention can be also suitably used as a coating film having excellent water-repellency.

EMBODIMENTS OF THE INVENTION

In the method of producing a ultra high molecular weight polyethylene film according to the present invention, at first, a film is molded using a ultra high molecular weight polyethylene as starting material.

Here, as the ultra high molecular weight polyethylene material used in the film molding, a polyethylene having a viscosity average molecular weight (Mv) of 1,000,000 to 12,000,000 is preferred, and a polyethylene having a viscosity average molecular weight (Mv) of 1,200,000 to 6,000,000 is more preferred. Here, the viscosity average molecular weight is a value measured in a decalin solvent (135° C.) and the intrinsic viscosity is preferably 5 to 50 dl/g, more preferably 8 to 40 dl/g, still more preferably 10 to 30 dl/g.

The form of the ultra high molecular weight polyethylene material to be used in the film molding is not particularly restricted; however, a granular or powder-form ultra high molecular weight polyethylene is preferred, and a powder-form ultra high molecular weight polyethylene is more preferred. The particle size of the powder-form ultra high molecular weight polyethylene is, in terms of the volume average particle diameter ($D_{50}$), preferably not greater than 2,000 µm, more preferably 1 to 2,000 µm, still more preferably 10 to 1,000 µm.

The ultra high molecular weight polyethylene can be any polymer thereof as long as it has been polymerized using a known catalyst; however, a ultra high molecular weight polyethylene polymerized using a Ziegler catalyst or metallocene catalyst is preferably used.

The method of molding a film from such ultra high molecular weight polyethylene is not particularly restricted, and examples thereof include press molding, roll molding, kneading and extrusion molding, skiving method and inflation molding. Thereamong, press molding and roll molding are more preferred. Roll molding is described in JP 2003-165155A.

When molding a film from a ultra high molecular weight polyethylene, it is preferred that the ultra high molecular weight polyethylene material be molded at a temperature higher than the melting point thereof. In particular, it is more preferred that the molding be carried out at 140 to 250° C. The term "melting point" used in the present invention refers to a peak temperature (° C.) in a DSC curve obtained by a differential scanning calorimeter (DSC). Although it is variable depending on the molecular weight of the ultra high molecular weight polyethylene, it is about 130 to 136° C.

In the method according to the present invention, the thus molded polyethylene film is then biaxially drawn in the x-axis and y-axis directions at a temperature not lower than the melting point of the ultra high molecular weight polyethylene material. This biaxial drawing process may be subsequent biaxial drawing where the film is first drawn in one direction (x-axis) and then in the vertical direction (y-axis) which is vertical to the first drawing direction; however, simultaneous biaxial drawing where the film is drawn simultaneously in the x-axis and y-axis direction (longitudinal and transverse directions) is preferred.

The biaxial drawing treatment may be carried out at any temperature higher than the melting point of the ultra high molecular weight polyethylene; however, it is preferably 136 to 165° C., more preferably 140 to 155° C., still more preferably 145 to 155° C. The temperature may be altered during the biaxial drawing treatment as long as it stays within the above-described range.

It is preferred that the draw ratio in the biaxial drawing be, in both of the x-axis and y-axis directions, 2 to 20 times of the length before the drawing. The draw ratios in the x-axis and y-axis directions are allowed to be the same or different.

Here, in order to efficiently carry out the biaxial drawing in a molten state, it is preferred that the drawing be carried out using a hot-air blowing-type biaxial drawing machine or the like in a condition in which only the central portion of the film is allowed to melt, but not the chuck portion (end portion) thereof. In this case, in order to confirm that the biaxial drawing is being carried out in a molten state, it is preferred that the biaxial drawing machine may be equipped with a stress detection mechanism. In addition, since the film becomes gradually thinner and more likely to slip at the chuck portion (end portion) as the drawing progresses, it is preferred that the machine be equipped with a chuck mechanism which continuously applies a constant gripping force, such as an air-chuck mechanism.

In the method according to the present invention, the film is biaxially drawn and then subjected to a shrinkage treatment (retraction treatment) along at least one of the x-axis and y-axis. The shrinkage treatment may be carried out immediately after the biaxial drawing, or the film may be biaxially drawn and then maintained at the shrinkage treatment temperature for a certain period of time (for example, about 1 to 10 minutes) followed by the shrinkage treatment. The shrinkage treatment temperature is preferably 80° C. to 180° C., more preferably 120° C. to 165° C., still more preferably 136 to 165° C., especially preferably 140 to 155° C. The temperature may be altered during the shrinkage treatment as long as it stays within the above-described range.

In cases where the shrinkage treatment is carried out along both of the x-axis and y-axis, the film may be allowed to shrink in one direction first and then in the vertical direction to the first shrinking direction subsequently; however, it is preferred that the film be allowed to shrink in both of the x-axis and y-axis directions simultaneously.

As for the shrinkage ratio, the shrinkage treatment is carried out in such a manner that the post-shrinkage lengths become preferably 5 to 95%, more preferably 20 to 75%, of the pre-shrinkage lengths (the lengths after the biaxial drawing) in the x-axis and y-axis directions. The shrinkage ratios in the x-axis and y-axis directions are allowed to be the same or different.

Further, after the shrinkage treatment, a heat treatment may also be carried out by maintaining the film at a temperature higher than the one at which the film is eventually taken out (usually room temperature), preferably 80° C. to 180° C., more preferably 120° C. to 155° C., for a certain period of time (for example, about 5 to 10 minutes). The temperature may be altered during the heat treatment as long as it stays within the above-described range.

In the method according to the present invention, after the shrinkage treatment, a re-drawing treatment may be further carried out along at least one of the x-axis and y-axis. The re-drawing treatment may be carried out immediately after the shrinkage treatment, or the film may be subjected to the shrinkage treatment and then to a step (heat treatment step) where the film is maintained at a temperature higher than the one at which the film is eventually taken out (usually room temperature) for a certain period of time (for example, about 5 to 10 minutes) before being re-drawn. In the same manner as the initial biaxial drawing treatment, the re-drawing treatment may also be carried out at any temperature higher than the melting point of the ultra high molecular weight polyethylene; however, it is preferably 136 to 165° C., more preferably 140 to 155° C., still more preferably 145 to 155° C. The temperature may be altered during the re-drawing treatment as long as it stays within the above-described range.

In cases where the re-drawing treatment is carried out along both of the x-axis and y-axis, the film may be drawn in one direction first and then the vertical direction to the first shrinking direction subsequently; however, it is preferred that the film be drawn in both of the x-axis and y-axis directions simultaneously.

It is preferred that the draw ratio in the re-drawing be, in both of the x-axis and y-axis directions, 2 to 20 times of the length before the drawing. The draw ratios in the x-axis and y-axis directions are allowed to be the same or different.

By this re-drawing treatment, the tensile strength at break can be further improved.

In addition, after such re-drawing treatment, the above-described shrinkage treatment or heat treatment may be further carried out. Moreover, these drawing treatment, shrinkage treatment, heat treatment and re-drawing treatment may also be repeated as appropriate. In cases where these treatments are repeated, the order and number thereof may be arbitrarily changed.

By the method according to the present invention, a thin ultra high molecular weight polyethylene film having high physical properties can be obtained. That is, the ultra high molecular weight polyethylene film obtained by the method according to the present invention has a thickness of preferably 0.1 to 100 µm, more preferably 0.5 to 50 µm.

When the film is used as a lithium ion battery separator, since the films can be stacked at a higher density by making them thin, it can advantageously allow the lithium ion battery to demonstrate high power output.

In addition, the ultra high molecular weight polyethylene film obtained by the method according to the present invention has very high uniformity, and the later-described full width at half-maximum (FWHM) of DSC melting peak is narrower than 20.0° C., more preferably narrower than 10.0° C., especially preferably narrower than 6.0° C.

The method according to the present invention may further comprise, after the shrinkage treatment, the step of subjecting the thus obtained ultra high molecular weight polyethylene film to a pore-forming treatment.

For example, a porous film can be molded by further uniaxial drawing or biaxial drawing the film obtained from the shrinkage treatment in a solid state (at a temperature not higher than the melting point of the film). By this, a microporous film having a pore size of several tens of nanometers can be prepared without using an organic solvent.

Conventionally, in a method of producing a lithium ion battery separator, a film is made porous by removing an organic solvent previously mixed therein (such as decalin or paraffin) by evaporation or extraction and the pore sizes are adjusted by drawing the thus obtained film (JP 2004-182763). In contrast, in the present invention, since a microporous film having a pore size of several tens of nanometers can be prepared without using any solvent, it can be said that the method according to the present invention is environmentally friendly and harmless to the health of production operators.

The ultra high molecular weight polyethylene film obtained by the method of the present invention has both the tensile strength at break and tear strength at a high level and practically sufficient mechanical properties, as well as an excellent balance in these mechanical properties; therefore, it is suitably used in a variety of fields including various industrial tapes such as adhesive tapes, abrasion-resistant tapes and damage-resistant tapes, barrier films, water-repellent coating films, packaging films, lithium ion battery separators, white reflection films and neutron-blocking films.

EXAMPLE

Examples of the present invention will now be explained; however, the present invention is not restricted thereto by any means. Here, the draw ratios such as 8×8 are based on an undrawn film (1×1 times).

Example 1

Figure 1:
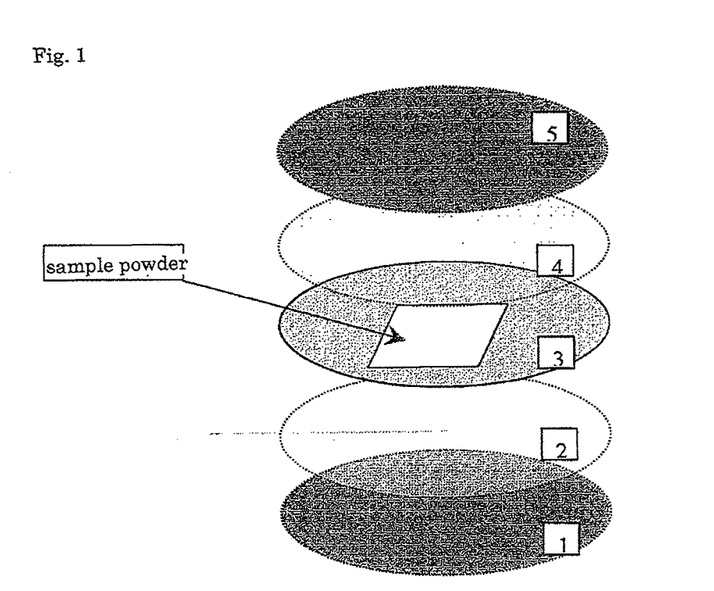
FIG. 1 shows a schematic diagram of press molding.

As shown in FIG. 1, on the top of a discoid stainless plate (1) having a diameter of 110 mmφ and thickness of 2 mm, a polyimide film for mold-separation (2) having thickness of 125 µm was placed, followed by a discoid stainless plate (3) having a diameter of 110 mmφ and a thickness of 0.3 mm with a rectangular empty window in a size of 70 mm×70 mm created. Then, inside the rectangular window, 2.2 g of ultra high molecular weight polyethylene (UHMW-PE) powder having a viscosity average molecular weight of $3.3 \times 10^6$ (Hizex Million 340M manufactured by Mitsui Chemicals, Inc.: particle size=150 µm) was placed, and on top thereof, a polyimide film for mold-separation (4) having a thickness of 125 µm was placed, followed by a discoid stainless plate (5) having a diameter of 110 mmφ and a thickness of 2 mm.

The whole was placed between the upper and lower plates in a press machine (manufactured by Baldwin Corporation) installed inside a vacuum chamber at room temperature. After reducing the pressure therein to $10^{-1}$ Torr using a rotary pump, the upper and lower press plates were brought closer as much as possible to an extent that no stress is applied to the material. The material was heated to 180° C. and maintained at this temperature for 5 minutes. Then, pressing the material at a pressure of 4.5 MPa (cylinder pressure=60 MPa) was made, then with the applied pressing pressure maintained, the heater power was turned off to cool the material to room temperature under the vacuum condition maintained. Thereafter, the vacuum chamber was opened and a molded film was taken out.

The film obtained in this manner was cut out in a square of 25 mm×25 mm (undrawn: 1×1 times), and then, by a planar-expansion drawing machine equipped with an air-chuck mechanism (manufactured by Island Industry Co., Ltd.), the obtained square film was biaxially drawn simultaneously in the longitudinal and transverse directions to 7×7 times at 150° C., which is a temperature not lower than the melting point of the film (hereinafter, referred to as "drawing treatment"). Then, while maintaining the film at 150° C., the film was subjected to a "shrinkage treatment" to be shrunk to 4×4 times. After performing a heat treatment by maintaining the film in this condition for 5 minutes, the film was quickly cooled to room temperature and the air-chuck was then released to take out the film.

For the thus obtained polyethylene film, the tensile strength at break, tear strength and tear energy were measured. The measurements of these mechanical properties were carried out at room temperature using a universal tensile tester RTC-1325A manufactured by Baldwin Corporation. Here, in the measurement of the tensile strength at break, a ribbon-shaped sample piece (a straight section of 30.0 mm in length and 5 mm in width to be tested) was cut out and tested, and a value obtained by dividing the maximum stress determined from a stress chart recorded at a tensile rate of 20 mm/min by the cross-sectional area of the film was defined as the tensile strength at break. Meanwhile, in the measurements of the tear strength and energy, a 20-mm notch was created in the longitudinal direction of a belt-shaped film having a size of 25 mm in width and 40 mm in length, and both holding ends of the belt-shaped film were connected to the RTC-1325A to carry out a tear test at a tearing rate of 200 mm/min. A value obtained by dividing the maximum stress determined from a stress chart recorded by the stress detection cell installed in the testing machine by the film thickness was defined as the tear strength, and a value obtained by dividing the chart area by the film thickness was defined as the tear energy. As a result, the obtained film had a tensile strength at break of 42.5 MPa, tear strength of 17.6 N/mm and tear energy of 154.7 mJ/mm.

Further, the obtained film was biaxially drawn to 8×8 times at 120° C., which is a temperature at which the film is in a solid state, so that the film was made porous due to lamellar separation.

Figure 2:
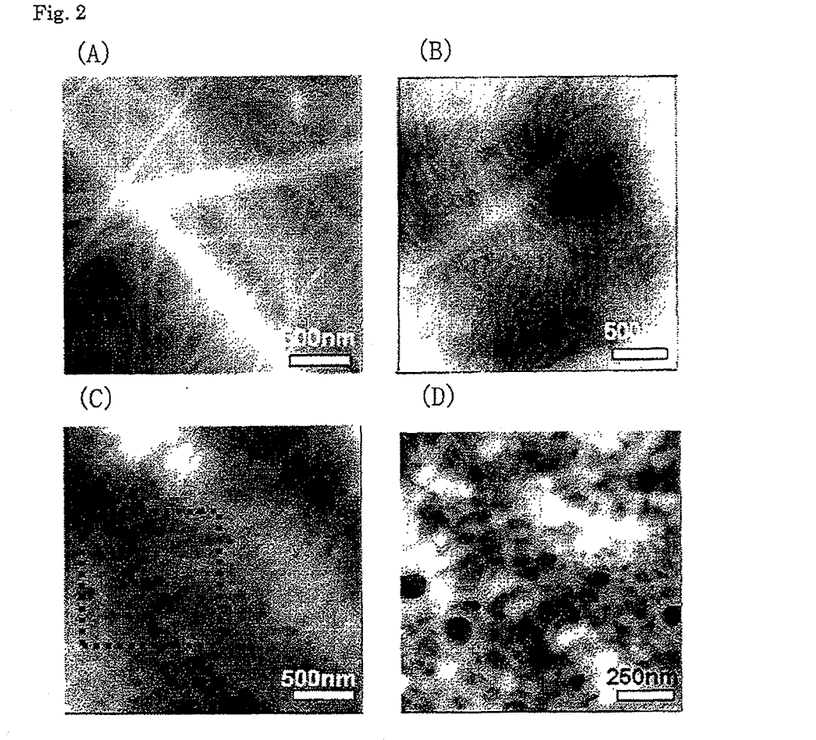
FIG. 2 shows scanning probe micrographs of a ultra high molecular weight polyethylene film obtained after each step: (A) after drawing; (B) after shrinkage treatment; and (C) and (D) after pore-forming treatment. The micrograph (D) is an enlargement of the dashed box in (C). The scale bars of (A), (B) and (C) represent 500 nm and that of (D) represents 250 nm.

FIG. 2 shows scanning probe micrographs of the film after each treatment. As the scanning probe microscope, E-Sweep manufactured by SII NanoTechnology Inc. was employed.

First, it is observed that the structure (A), which was not uniform before the shrinkage treatment (after the biaxial drawing treatment), became a uniform structure (B) having regularly arranged lamellae by the shrinkage treatment. Further, it is considered that the shrinkage treatment reduced the extended-chain crystals by orientation relaxation, leading to an increase in the tear strength. Moreover, it is observed that, because of the uniformly and regularly structured lamellae, an applied stress became more likely to be dispersed across the entire film rather than locally, resulting in an increase in the tensile strength. From the above, it was found that the mechanical properties of the film were improved.

Furthermore, when such regularly structured film was subjected to a pore-forming treatment, it was found that, the stress was uniformly transmitted and lamellae were separated by drawing such regularly structured film in a solid state, so that a microporous structure having pore sizes of 10 to 100 nm was formed, as shown in (C) and (D) which is an enlargement of the dashed box in (C).

Example 2

A ultra high molecular weight polyethylene film was prepared in the same manner as in Example 1, except that the "drawing treatment" was changed to simultaneous biaxial drawing of 7×7 times at 145° C. and the "shrinkage treatment" was performed to 4×4 times at 145° C., followed by the "heat treatment". The tensile strength at break and tear strength of the obtained film were measured. As a result, the tensile strength at break was 40.5 MPa and the tear strength was 16.6 N/mm.

Comparative Example 1

The "drawing treatment" in Example 1 was changed to simultaneous biaxial drawing of 4×4 times at 150° C. The resulting film was quickly cooled to room temperature without being subjected to the "shrinkage treatment" and the air-chuck was then released to take out a film. The obtained film had a tensile strength at break of 23.1 MPa, tear strength of 9.8 N/mm and tear energy of 62.3 mJ/mm.

From the above, it was found that, in the case of preparation of a film of 4×4 times, the tensile strength at break and tear strength of the ultra high molecular weight polyethylene film can be increased by allowing it to shrink to 4×4 times after drawing it by more than 4×4 times, rather than by directly obtaining a film of 4×4 times by drawing.

Comparisons of Physical Properties

Analyses by Scanning Electron Microscope

FIGS. 3(A) to (D) are images taken by a scanning electron microscope (S-4800 manufactured by Hitachi High-Technologies Corporation: acceleration voltage=1 kV) and show the surfaces and cross-sections of the film obtained in Example 1 (7×7→4×4) and the film obtained in Comparative Example 1 (4×4). As a result of the analyses, since the film obtained in Example 1 had the folded-chain crystals with a uniform thickness and with random orientation, it was found that a stress is likely to be dispersed and the mechanical properties are improved. In addition, also with respect to the film cross-sections, it was found that the folded-chain crystals in the film of Example 1 were randomly oriented while those in the film of Comparative Example 1 were oriented perpendicular to the drawing direction.

Figure 3:
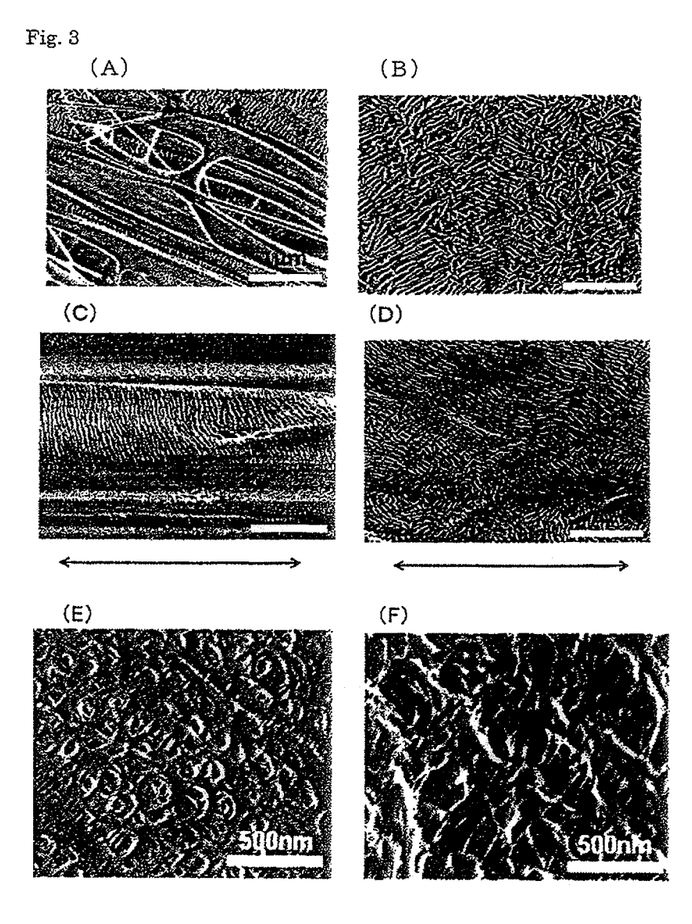
FIG. 3 shows scanning electron micrographs. (A), (B) and (E) are images of film surfaces, and (C), (D) and (F) are images of cross-sections of films. (A) and (C) are images of a film which was subjected to only drawing, and (B) and (D) are images of a film which was subjected to a shrinkage treatment after being drawn. (E) and (F) are images of a film subjected to a pore-forming treatment. The scale bars of (A) and (B) represent 1 μm, those of (C) and (D) represent 2 μm and those of (E) and (F) represents 500 nm. The arrows in (C) and (D) indicate the drawing direction.

Further, FIGS. 3(E) and (F) show scanning electron micrographs of the surface and cross-section of the porous film obtained in Example 1 (7×7→4×4→8×8). From these micrographs, it was confirmed that pore structures having a relatively uniform size of several tens of nanometers were formed at both of the film surface and film cross-section. This is speculated to be because separations occurred uniformly within the amorphous phase due to the network structure of the folded-chain crystals of the film subjected by shrinkage treatment.

Differential Scanning Calorimetry (DSC)

Figure 4:
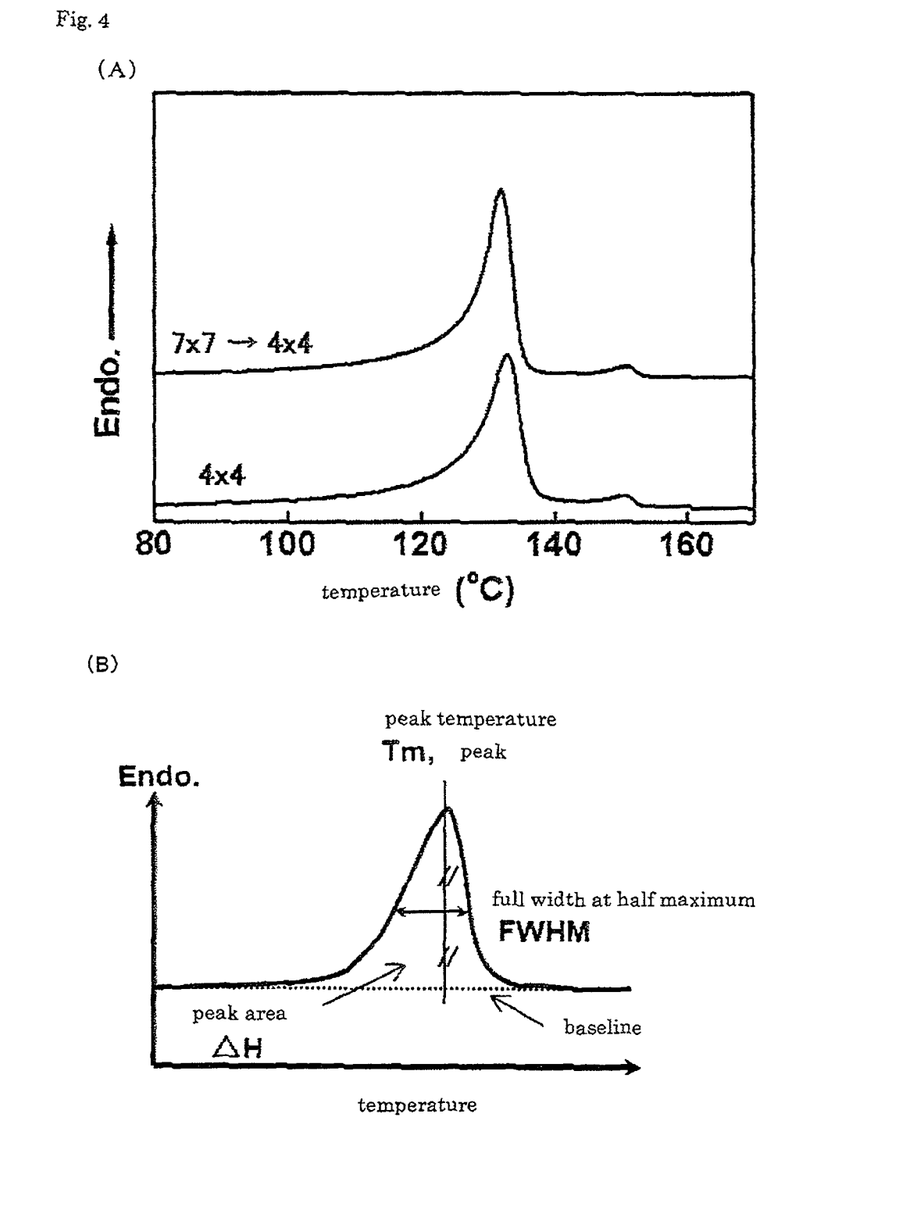
FIG. 4 shows the results of differential scanning calorimetry (DSC). The graph (A) shows the results for a film which was allowed to shrink to 4×4 after being drawn by 7×7 and a film which was directly drawn to 4×4. (B) shows a method of calculating full width at half-maximum (FWHM) based on a graph obtained by differential scanning calorimetry.

For the films obtained in Example 1 (7×7→4×4) and Comparative Example 1 (4×4), DSC measurements (using Diamond DSC manufactured by PerkinElmer, Inc.: aluminum pan) was performed by increasing the temperatures thereof from 50° C. to 180° C. at a heating rate of 10° C./min. Here, the temperature and heat flow were calibrated with standard substances (indium and tin). The results are shown in FIG. 4A and Table 1. "Tm, peak" in Table 1 represents melting peak temperature and "FWHM" represents full width at half-maximum of the melting peak calculated in the manner shown in FIG. 4B. That is, FWHM is, at the melting temperature, the width of the melting peak at the height exactly half of the peak-top height from the baseline, and, therefore, is an index to represent how wide the melting peak is. The melting peak shape of polyethylene reflects the thickness distribution of crystals (Kobunshi Ronbunshuu, vol. 58, no. 7, pp. 326-331 (2001)), and it is known that a narrower melting peak means a narrower thickness and size distributions of the crystals.

Meanwhile, "Xc" means crystallinity and is calculated by dividing the ΔH value, which is the melting peak area indicated in parentheses, by the ΔH of polyethylene in 100% crystalline state (290 J/g).

TABLE 1

| | <DSC measurement data> | | |
| --- | --- | --- | --- |
| Sample | Tm, peak (° C.) | FWHM (° C.) | Xc (%) |
| Example 1 (7 × 7 → 4 × 4) | 132.16 | 5.06 | 55.4 (160.6 J/g) |
| Comparative Example 1 (4 × 4) | 133.02 | 6.44 | 54.0 (156.6 J/g) |

From these values, it is understood that, in Example 1, the width of the melting peak was narrower and the film was constituted by crystals having more uniform thickness.

Evaluation of Water Repellency

Next, for the film (7×7→4×4) and porous film (7×7→4×4→8×8) that were obtained in Example 1, as well as for the film (4×4) obtained in Comparative Example 1, the water repellency was evaluated by measuring the contact angle using DROP MASTER 100 (manufactured by Kyowa Interface Science Co., Ltd.). As a result, as shown in Table 2, it was found that the water repellency was slightly improved by the shrinkage treatment in the film of Example 1 and that the water repellency was further improved by subjecting the film to a pore-forming treatment.

Therefore, the polyethylene film according to the present invention can also be suitably used as a water-repellent coating film.

TABLE 2

<Water repellency>

| Sample | Contact angle (water) (°) |
|---|---|
| Undrawn film | 76.2 |
| Comparative Example 1 (4 × 4) | 99.8 |
| Example 1 (7 × 7 → 4 × 4) | 102.2 |

TABLE 2-continued

<Water repellency>

| Sample | Contact angle (water) (°) |
|---|---|
| Example 1 (with pore-forming treatment) (7 × 7 → 4 × 4 → 8 × 8) | 108.2 |

Comparative Examples 2 to 4 and Examples 3 to 21

Films were prepared by the same procedures as in Examples 1 and 2 and Comparative Example 1, except that conditions such as drawing temperature, draw ratio, shrinkage temperature, shrinkage ratio and heat treatment temperature were changed. For these obtained films, the tensile strength at break, tear strength and tear energy of these films were determined. The results are shown in Table 3. As a result, it was found that the mechanical properties of these films were improved by performing the shrinkage treatment. Here, "n.d." in Table 3 means "not determined". Further, "Heat treatment step 1" represents the step of maintaining the film for 1 minute at the respective shrinkage treatment temperature before the shrinkage treatment, and "Heat treatment step 2" represents the step of maintaining the film at the respective temperature for 5 minutes after the shrinkage treatment.

In Example 22 of Table 3, after being drawn to 4×4 times at 140° C. and then allowed to shrink to 2×2 times at 150° C., the film was re-drawn to 8×8 times at 150° C. In Example 23, after being drawn to 3×3 times at 140° C. and then allowed to shrink to 2×2 times at 140° C., the film was re-drawn to 6×6 times at 150° C. It is seen that these re-drawing treatments further improved the tensile strength at break of these films.

TABLE 3

| | Biaxial drawing condition | | Drawing step | | Heat treatment step 1 | Shrinking step | | Heat treatment step 2 | Tensile strength at break [MPa] | Tear strength [N/mm] | Tear energy [mJ/mm] |
|---|---|---|---|---|---|---|---|---|---|---|---|
| | State of the film | Direction | Temperature [° C.] | Draw ratio | Holding time (min) | Temperature [° C.] | Ratio after shrinking | Temperature [° C.] | | | |
| Comparative Example 1 | molten | simultaneously | 150 | 4 × 4 | | — | — | — | 23.1 | 9.8 | 62.3 |
| Comparative Example 2 | molten | simultaneously | 150 | 8 × 8 | | — | — | — | 62.1 | 6.0 | 52.5 |
| Comparative Example 3 | molten | simultaneously | 150 | 6 × 6 | | — | — | — | 26.5 | 8.5 | 61.4 |
| Comparative Example 4 | molten | simultaneously | 150 | 2 × 2 | | — | — | — | 18.6 | 23.0 | 203.4 |
| Example 1 | molten | simultaneously | 150 | 7 × 7 | | 150 | 4 × 4 | 150 | 42.5 | 17.6 | 154.7 |
| Example 2 | molten | simultaneously | 145 | 7 × 7 | | 145 | 4 × 4 | 145 | 40.5 | 16.6 | n.d. |
| Example 3 | molten | simultaneously | 150 | 7 × 7 | | 150 | 4 × 4 | 155 | 29.2 | 20.8 | n.d. |
| Example 4 | molten | simultaneously | 150 | 7 × 7 | 1 | 150 | 4 × 4 | 145 | 26.5 | 15.2 | n.d. |
| Example 5 | molten | simultaneously | 150 | 7 × 7 | 1 | 150 | 4 × 4 | 135 | 34.5 | 16.3 | n.d. |
| Example 6 | molten | simultaneously | 150 | 7 × 7 | 1 | 150 | 4 × 4 | 125 | 29.0 | 12.3 | n.d. |
| Example 7 | molten | simultaneously | 150 | 6 × 6 | | 155 | 4 × 4 | 155 | n.d. | 16.5 | 118.4 |
| Example 8 | molten | simultaneously | 150 | 5 × 5 | 1 | 155 | 4 × 4 | 155 | n.d. | 14.2 | 102.2 |
| Example 9 | molten | simultaneously | 150 | 6 × 6 | | 145 | 4 × 4 | 145 | n.d. | 15.6 | n.d. |
| Example 10 | molten | simultaneously | 150 | 6 × 6 | 1 | 150 | 4 × 4 | 150 | n.d. | 14.3 | n.d. |
| Example 11 | molten | simultaneously | 150 | 6 × 6 | 1 | 155 | 4 × 4 | 155 | n.d. | 16.5 | n.d. |
| Example 12 | molten | simultaneously | 150 | 7 × 7 | 1 | 150 | 4 × 4 | — | 33.6 | 12.4 | n.d. |
| Example 13 | molten | simultaneously | 150 | 7 × 7 | 1 | 145 | 4 × 4 | 145 | n.d. | 13.2 | 151.7 |
| Example 14 | molten | simultaneously | 150 | 7 × 7 | 1 | 155 | 4 × 4 | 155 | n.d. | 20.5 | 176.7 |
| Example 15 | molten | simultaneously | 150 | 9 × 9 | 1 | 145 | 8 × 8 | 145 | n.d. | 7.9 | 58.4 |
| Example 16 | molten | simultaneously | 150 | 9 × 9 | 1 | 135 | 8 × 8 | 135 | n.d. | 7.2 | 64.7 |
| Example 17 | molten | simultaneously | 150 | 8.4 × 8.4 | | 120 | 8 × 8 | 120 | n.d. | 9.3 | 67.3 |
| Example 18 | molten | simultaneously | 150 | 6.3 × 6.3 | | 120 | 6 × 6 | 120 | n.d. | 9.8 | 78.8 |
| Example 19 | molten | simultaneously | 150 | 2.1 × 2.1 | 1 | 120 | 2 × 2 | 120 | n.d. | 23.5 | 219.5 |
| Example 20 | molten | simultaneously | 150 | 3 × 3 | | 150 | 2 × 2 | 150 | 26.7 | n.d. | n.d. |
| Example 21 | molten | simultaneously | 140 | 3 × 3 | | 140 | 2 × 2 | 150 | 27.0 | n.d. | n.d. |
| Example 22 | molten | simultaneously | 140 | 4 × 4 | | 150 | 2 × 2 | 150(8 × 8) | 116.6 | 8.2 | n.d. |
| Example 23 | molten | simultaneously | 140 | 3 × 3 | | 140 | 2 × 2 | 150(6 × 6) | 45.3 | 12.5 | n.d. |

INDUSTRIAL APPLICABILITY

The ultra high molecular weight polyethylene film obtained by the method according to the present invention is suitably applied in a variety of fields including various industrial tapes such as adhesive tapes, abrasion-resistant tapes and damage-resistant tapes, packaging films, lithium ion battery separators, white reflection films and neutron-blocking films. Further, the film has a higher tear strength as compared to existing lithium ion battery separators and is excellent in the tear resistance. Currently, it is industrially demanded to achieve a high power output of lithium ion battery by winding separator films at a higher tension along with electrodes for integration of battery cells at the stage of the cell stack production; however, in existing lithium ion batteries, the films are likely to broken with bending when the cell stacks are molded into a flat form after being rolled up. In contrast, if the ultra high molecular weight polyethylene film molded by the technology of the present invention is used for such lithium ion battery cells, a highly assembled cell stack can be attained and the power output can be consequently increased.

The invention claimed is:

1. A method of producing an ultra high molecular weight polyethylene film, the method comprising the steps of:
   molding a film using an ultra high molecular weight polyethylene material;
   subjecting the film to a biaxial drawing simultaneously in the x-axis and y-axis directions at 136° C. to 165° C.; and
   subjecting the film to a biaxial shrinkage treatment simultaneously in the x-axis and y-axis directions at 136° C. to 165° C.

2. The method of claim 1, wherein the ultra high molecular weight polyethylene material has a viscosity average molecular weight of 1,000,000 to 12,000,000.

3. The method of claim 1, wherein the biaxial drawing step is carried out at 145° C. to 155° C.

4. The method of claim 1, wherein the biaxial shrinkage treatment step is carried out at 140° C. to 155° C.

5. The method of claim 1, further comprising a step of subjecting the film to heat treatment(s) after the biaxial drawing step or the biaxial shrinkage treatment step.

6. The method of claim 5, further comprising a step of re-drawing the film along at least one of the x-axis and y-axis after the biaxial shrinkage treatment step or the heat treatment(s).

7. The method of claim 1, further comprising a step of re-drawing the film along at least one of the x-axis and y-axis after the biaxial shrinkage treatment step.

8. The method of claim 6, wherein the biaxial shrinkage treatment step, the heat treatment(s), and/or the re-drawing step is/are further repeated.

9. The method of claim 1, further comprising a step of subjecting the film to a pore-forming treatment.

10. A method of improving at least either of the tensile strength at break or tear strength of an ultra high molecular weight polyethylene film, the method comprising the steps of:
    molding a film using an ultra high molecular weight polyethylene material;
    subjecting the film to a biaxial drawing simultaneously in the x-axis and y-axis directions at 136° C. to 165° C.; and
    subjecting the film to a biaxial shrinkage treatment simultaneously in the x-axis and y-axis directions at 136° C. to 165° C.

11. The method of claim 10, wherein the biaxial drawing step is carried out at 145° C. to 155° C.

12. The method of claim 10, wherein the biaxial shrinkage treatment step is carried out at 140° C. to 155° C.

* * * * *